May 28, 1963 W. C. PEASE III, ET AL 3,091,001
SAW TYPE COTTON GIN AND PROCESS FOR GINNING COTTON
Filed Feb. 24, 1959 3 Sheets-Sheet 1

INVENTORS.
Arvel L. Vandergriff
BY William C. Pease III

Jennings, Carter & Thompson
Attorneys

May 28, 1963 W. C. PEASE III, ET AL 3,091,001
SAW TYPE COTTON GIN AND PROCESS FOR GINNING COTTON
Filed Feb. 24, 1959 3 Sheets-Sheet 2

INVENTORS.
Arvel L. Vandergriff
William C. Pease III
BY
Jennings, Carter & Thompson
Attorneys

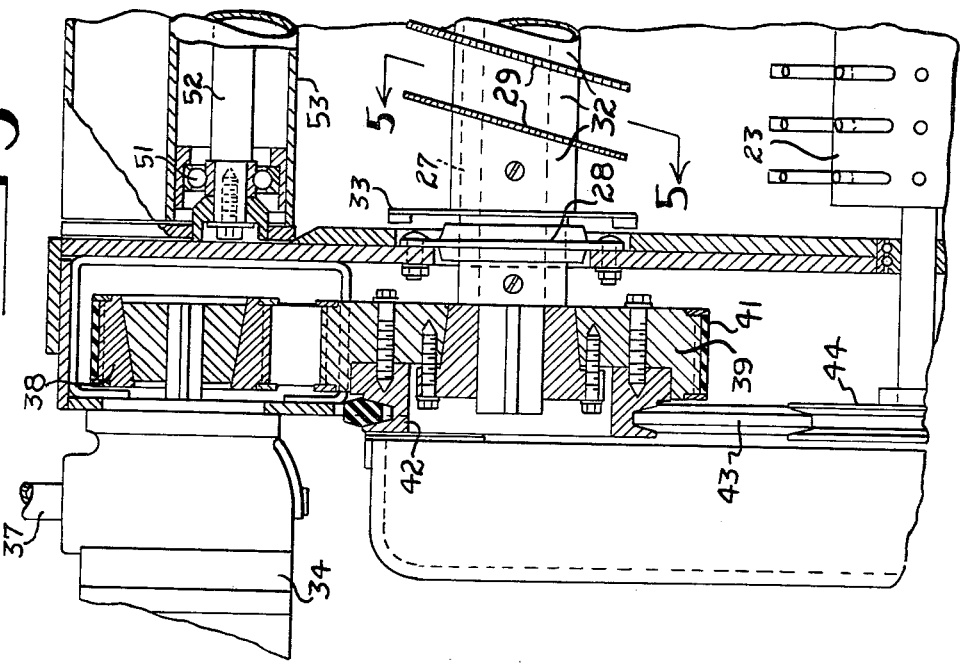
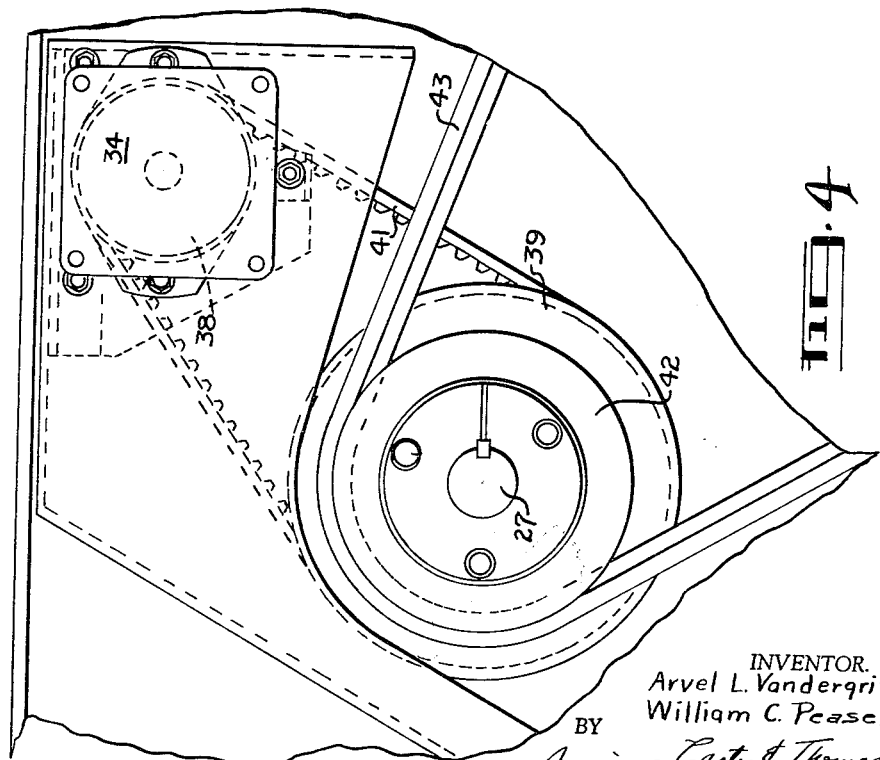

United States Patent Office 3,091,001
Patented May 28, 1963

3,091,001
SAW TYPE COTTON GIN AND PROCESS
FOR GINNING COTTON
William C. Pease III and Arvel L. Vandergriff, Columbus, Ga., assignors to Lummus Cotton Gin Company, a corporation of Georgia
Filed Feb. 24, 1959, Ser. No. 794,960
11 Claims. (Cl. 19—55)

Our invention relates to an improved saw type cotton gin and to a process for ginning cotton.

In the art of ginning cotton with saw type gins as heretofore practiced, the essential operations are to cause the teeth of a plurality of saws to engage the locks of seed cotton and pull them into a roll box to form what is called in the trade a "seed roll." The seed roll rotates in the box inasmuch as it is engaged by the peripheries of the rotating saws. As the locks of cotton are pulled into and through the roll they become positioned against the ginning ribs, which as known are spaced too close together to pass the seed. The saw teeth thus pull the fibers from the seeds next to the ginning ribs and finally, after the fibers are pulled off, the seeds fall out of the seed roll adjacent the huller rib side of the roll and go to discharge.

In our investigations into the general principles of ginning, we have discovered that saw type gins as heretofore constructed and operated do not deliver lint cotton at anything like the potential capacity of the saws. More specifically, we have discovered that as the saws move through the seed roll there are left unfilled furrows or valleys in which large segments of the saws in the roll box operate. Consequently, the teeth are not loaded with lint and in fact have no opportunity to become loaded because they are operating in areas where, in effect, no cotton contacts the teeth. Likewise, prior seed rolls rotate at a relatively slow rate, thus prolonging time-wise the duration of inaccessability of each saw to cotton which could load the teeth thereof. Friction of the seed roll against the walls of the roll box has contributed to slow rotation of prior seed rolls. Further, when ginning cotton which has been stripped, namely, in which the limbs, leaves, and stems as well as the cotton have been pulled from the stalks, such sticks and stems gravitate to the center of prior seed rolls. The saws contact such centrally located sticks and pull small pieces of bark, wood, etc. from them. A large number of such pieces are too small to go out with the seed and are too light to be "moted" out, that is, thrown off the saws by centrifugal force onto a trash discharge belt. Instead, such small particles are doffed with the lint, contaminating it and lowering its grade. Finally, seed rolls in prior gins have been exceedingly dense or compact and the action of saws under some conditions is to pack the roll still further, damaging the saws and ginning ribs.

Prior efforts have been made by all of the leading manufacturers of cotton gins to increase the capacity of each gin stand. By and large, it can be said that efforts in this direction have consisted principally in increasing the number of saws. Whereas before about 1930 a saw cylinder of seventy saws was very much standard, by about 1950 ninety saws per gin became the general standard. By 1958 most of the leading gin makers were offering to the trade gins with as many as one hundred twenty saws.

In attempting to increase the capacity of gins we have discovered that the principal way to accomplish this is to cause the teeth of the saws to be more effectively and constantly loaded. We have discovered that by positively driving the seed roll and simultaneously positively oscillating at least the lower section of the roll axially in the roll box, the saws continually engage the cotton and the work done by the saws is remarkably increased by more than 100%. Thus, instead of the saws operating largely in the furrows or voids as heretofore, we so operate the gin that new cotton contained in the seed roll is continuously presented to each saw. We further find that in order to contain the roll against the centrifugal action of the agitating cylinder it is necessary to limit the outside openings or slots to less than 25 degrees of the roll circumference to prevent it from discharging its contents through the openings. To accomplish this we have encompassed as much of the outer surface of it as possible with rollers, thus containing the roll to the desired shape with as little friction as possible. Further, by engaging the seed roll at its center the sticks heretofore mentioned are forced to occupy a position near the outside of the roll, in position for the saw teeth to engage them and break them into relatively large pieces which in fact either fall out with the seeds or "mote out." Also in our improved process and gin the density of the seed roll is materially decreased.

In view of the foregoing our invention has for its object the provision of a process and apparatus which shall make available in practical form and to commercial ginners the features and advantages set out above, all to the end that the capacity and efficiency of the gin shall be materially increased without increasing the number of saws.

More specifically an object is to provide a gin having positively driven means located generally centrally of the seed roll which shall be effective both positively to rotate the seed roll during ginning and simultaneously therewith to oscillate the roll axially, thereby to shift the circular sections of unginned seed locks into the path of the saws, replacing the seedy furrows in which the saws normally run. Thus, we accomplish the several advantages set forth above.

A further object is so to design the roll box and seed roll rotating and oscillating member that the density of the roll decreases from the upgoing side thereof, that is, on the side adjacent the ginning ribs, whereby the seeds in the roll from which all the lint have been removed are more readily discharged than from prior more dense seed rolls.

A gin illustrating the constructional features of our invention and one which may be employed to carry out our improved process is illustrated in the accompanying drawings forming part of this application, in which:

FIG. 3 is a fragmental detail sectional view of the drive end of the gin shown in FIG. 1, the view being drawn to a larger scale and illustrating the drive for the seed roll rotating and oscillating member;

FIG. 4 is an end elevational view of that part of the mechanism shown in FIG. 3;

FIG. 5 is a detail sectional view taken generally along line 5—5 of FIG. 3;

FIG. 6 is a fragmental elevational view of a different form of seed roll drive and oscillating member; and, FIG. 7 is an end elevational view of the member shown in FIG. 6.

Figure 1:
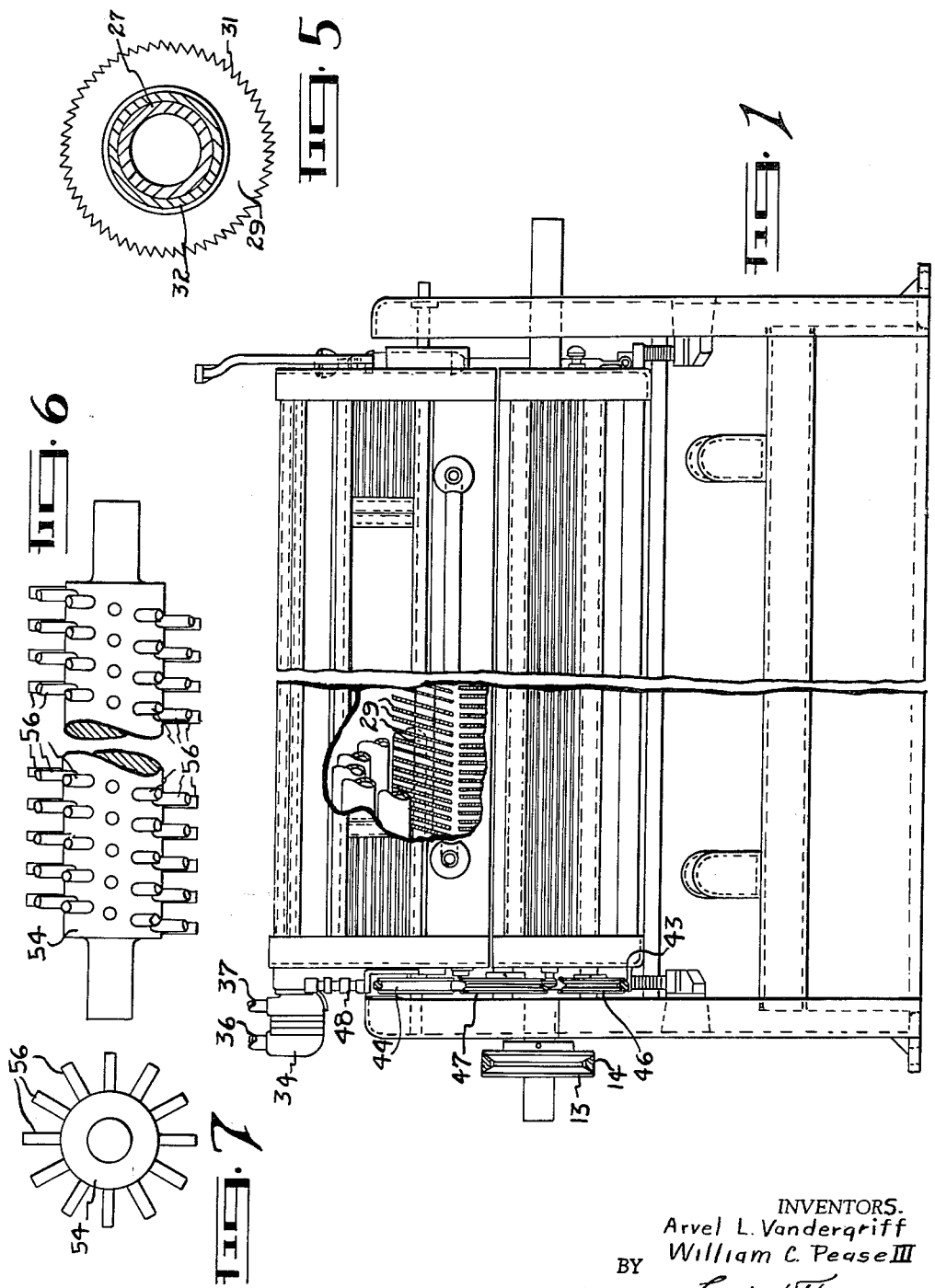
FIG. 1 is a front elevational view of a gin embodying our improvement, the view being partly broken away and in section.

Referring now to the drawings for a better understanding of our invention and more particularly to FIGS. 1 to 5, inclusive, we show our invention applied to a saw type gin of the air blast type equipped with an overhead mote belt. Thus, the gin stand incorporating our invention comprises a saw cylinder indicated generally by the numeral 10 and made up of a plurality of individual saws 11.

The saw cylinder shaft 12 is mounted in suitable bearings and the saw cylinder is driven by a pulley 13 and belt 14 from a source of power, not shown. The mote belt is indicated at 16 and the air blast chamber at 17. Lint is doffed from the saws by the air blast into a lint duct 18 in the manner well known. The gin is provided with huller ribs 21 and ginning ribs 22. Kicker rolls 23 serve the usual purpose of kicking the cotton against the saw cylinder to be drawn between the huller ribs into the roll box indicated generally by the numeral 24. Seeds fall downwardly into a seed conveyor 26.

Our invention comprises a shaft 27 mounted in the roll box and supported in suitable bearings, one of which is indicated at 28 in FIG. 3. Mounted on the shaft are a plurality of disc-like members 29. It will be noted that the discs preferably have teeth 31 around the periphery thereof. These discs are placed at an angle to the longitudinal axis of the shaft 27 thus to provide in effect a plurality of wobble members. The discs are held apart by spacers 32. At each end of the shaft 27 we provide a vertical plate 33 which may be welded to the end spacer 32 to serve as a sort of seal at the end of the shaft to prevent the cotton from becoming caught in the fastenings for the bearings 28.

We have found it convenient to drive the shaft 27 and discs 29 by an independent source of power. To this end we mount a fluid motor 34 on the end of the gin frame. Power for the motor may be supplied from a suitable source of fluid under pressure, not shown, through a flexible conduit 36 and a flexible return conduit 37. The motor 34 carries a cog belt pulley 38. A similar pulley 39 is fast on shaft 27. A cog belt 41 passes over these pulleys, thus positively to drive shaft 27.

As a convenience, we prefer to drive the kicker rolls 23 from motor 34. To this end we provide a pulley 42 on the side of the pulley 39. A V-belt 43 passes over pulley 42, and over pulleys 44 and 46 on the shafts of kicker rolls 23. As best shown in FIG. 1, an idler pulley 47 is provided over which the belt 43 passes. A handle 48 serves to dump the roll when desired.

Figure 2:
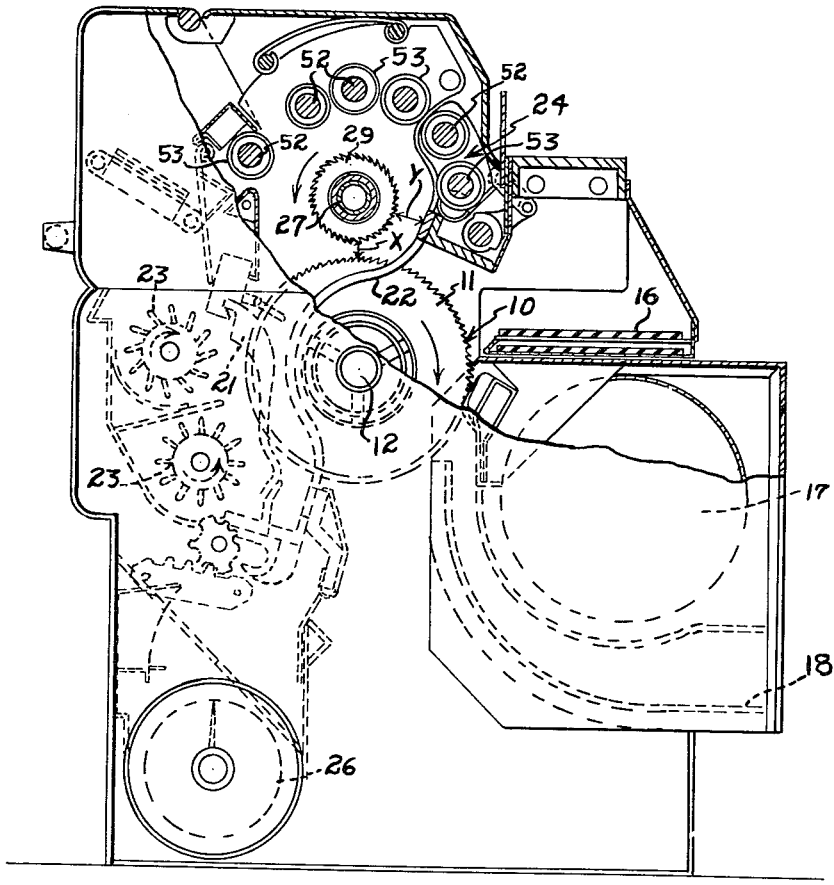
FIG. 2 is an end elevational view of the gin of FIG. 1 with certain parts broken away and in section.

Mounted on suitable anti-friction bearings 51 supported on shafts 52 in turn mounted to the heads of the gin are a plurality of rollers 53. As best shown in FIG. 2 rollers 53 are disposed relative to each other so as to define that part of the roll box which is generally diametrically opposite the shaft 12 from the periphery of the saws 10 in the roll box.

It will be noted that one of the rollers 53, namely the last one on the downgoing side of the seed roll, is spaced away from the main rolls. This affords an opportunity for the roll to open up somewhat, just prior to the last engagement by a roller 53, aiding in discharging the seeds.

From the foregoing the method of constructing and using our improved gin and for carrying out our improved process may now be more readily explained and understood. It will be understood that seed cotton is fed downwardly into the gin in the customary manner and that the kicker rolls 23 knock the cotton against the periphery of the several rotating saws 11. All of the parts are driven in the direction of the respective arrows shown in FIG. 2. Seed cotton thus is picked up by the saws and is drawn into the roll box 24, forming a seed roll. With the shaft 27 carrying discs 29 rotating the roll soon builds up around the shaft and discs and fills the space in the roll box 24, contacting the surfaces of the rollers 53 and rotating them by frictional engagement. As the shaft 27 and discs 29 are driven it will be seen that the wobble plate effect of the slanted mounting of the discs 29 and rotational slippage between discs 29 and the seed roll causes the seed roll, and particularly that portion of the periphery of the seed roll adjacent the saws, to oscillate axially in the roll box while it is rotating. We have found that this action causes the saws to engage fresh, non-grooved places in the roll, greatly increasing the efficiency as before stated. Rollers 53 aid materially in reducing the friction of rotation of the roll in the roll box and the roll is considerably looser than seed rolls heretofore found in gins.

It will be noted that the closest distance between the peripheries of the saws 11 and the discs 29 is substantially vertically above the saws 11. It will further be noted that as shown in FIG. 2, proceeding from the closest point counterclockwise there is an expanding or ever increasing volume to the roll box. Thus, the seed roll is at its most compact or densest condition on top of the saw cylinder and thereafter becomes more loose inasmuch as there is room for the seed roll to expand. We have found that this causes the seeds which have been cleaned of lint more readily to gravitate toward the outside of the roll so that they more readily drop out of the roll and pass down into the seed conveyor 26.

Instead of using the discs 29 which, incidentally, may or may not have the teeth 31 thereon, we may use the kicker roll shown in FIGS. 6 and 7. This roll 54 may have thereon a plurality of pins 56. These pins may project radially outward and yet be laid out on rows which are at an angle to the axis of the roll 54 thus in effect to form wobble plates. As a specific example, in a gin with 12" diameter saws the roll 54 may be 2½" diameter, the pins 56 may be 5/16 outside diameter by 1" long and there may be 12 of such pins in each of the rows.

The gin and process forming the subject matter of this application have been given considerable laboratory tests and have had a limited amount of field use at the time of the filing of this application.

As an example of the improvement afforded by our improved gin and process, we cite the following:

With an 88 saw gin, 12" diameter saws rotating at 900 r.p.m., using standard air blast nozzle and pressure, we have been able to gin, under ideal conditions, as high as seven bales of cotton per hour. This was accomplished with the shaft 27 having thereon 44 of the discs 29, these being 4½" outside diameter and made of 14 gauge steel, the spacers 32 being 2½" outside diameter tubing slipped over a shaft. Such discs were placed at an angle of 75 degrees from the horizontal axis of the shaft 27 and of course were parallel to each other on such mounting. The closest distance between the periphery of the saw cylinder and the discs was about ¾". The seed roll rotating and agitating assembly consisting of shaft 27 with the discs 29 was rotated at about 500 r.p.m. We detected some slip between the discs 29 and the seed roll and our best judgment is that the roll actually turned about one-half the speed of shaft 27. It will be understood that the spacing of the saws is less than the axial travel of the oscillating seed roll.

Referring to FIG. 2, it will be seen that from the closest clearance between the discs 29 and saws 11, the volume of the roll box between the discs and the adjacent roll box wall increases. Thus, at about the place indicated by the line X the distance may be about ¾". At the line Y the distance may be about 1½". The volume of the roll box thus is ever increasing in the direction of rotation of the seed roll, affording relief against compaction of the seed roll on its upgoing side. This arrangement appears to aid materially in maintaining a seed roll of low density.

The cotton ginned at this high rate of speed has been examined in the laboratory of the assignee of this application as well as by independent laboratories. Insofar as can be determined there is no deterioration in the quality of ginning and in fact we find that the grade has been raised slightly by reason of a decrease in the very small woody particles in the lint sample. In this connection we find that the saws actually do engage sticks which are near the periphery of the roll and break them into relatively large pieces which either go out with the seed or are thrown out onto belt 16 if they are pulled between the ginning ribs 22.

From the foregoing it will be apparent that we have devised an improved cotton gin and process for ginning cotton. By increasing the capacity of such gin we are enabled to gain all of the advantages of a short saw cylinder, with the resultant decrease in number of ribs, and the other advantages apparent to those skilled in the art. Further, we are able to apply our invention to what heretofore has been a 90 saw gin by eliminating only two saws, thus to make a final 88 saw gin which may simply be slipped into the place of the now standard 90 saw gin. Thus, there is no necessity for changing the drives and the various other mechanisms associated with the old gins if our improved new gin is put in its place.

In the appended claims the expression "wobble member" is intended to include broadly any means associated wth a shaft 27 to move the seed roll axially back and forth whether such means be discs, rows of pins, cams or other means. Likewise, expressions in the claims to the effect that the seed roll is oscillated back and forth are intended to include a shifting movement over the saws of only that part of the seed roll engaged by the saws, as well as shifting the entire roll.

While we have shown our invention in but two forms, it will be obvious to those skilled in the art that it is not so limited, but is susceptible of various changes and modifications without departing from the spirit thereof, and we desire, therefore, that only such limitations be placed thereupon as are specifically set forth in the appended claims.

What we claim is:

1. The combination with a cotton gin embodying a rotating saw cylinder disposed for operating upon a portion of the periphery of a seed roll in a roll box, of a shaft in the roll box extending the length thereof, members on the shaft projecting into the seed roll and effective to rotate the seed roll in said roll box, and means positively to rotate the shaft at a speed to provide rotational slippage between the seed roll and said projecting members and in a direction with the surface of the roll adjacent the saw cylinder turning in the same direction as the adjacent surface of the saw cylinder, said members on the shaft being effective upon rotation of the shaft at a greater speed than the seed roll to oscillate peripheral portions of the seed roll out of phase with each other, whereby that portion of the periphery of the seed roll being operated upon by the saw cylinder moves back and forth axially of the saw cylinder.

2. The combination of claim 1 in which the projecting means on the shaft are disc-like members and are provided with serrations or teeth on their peripheries.

3. The combination with a cotton gin embodying a rotating saw cylinder disposed for operating upon a portion of the periphery of a seed roll in a roll box, of an axially fixed rotatable shaft in the roll box extending the length thereof, means on the shaft projecting into the seed roll and effective to rotate the seed roll in said roll box, and means positively to rotate the shaft at a speed to provide rotational slippage between the seed roll and the projecting means and in a direction with the surface of the roll adjacent the saw cylinder turning in the same direction as the adjacent surface of the saw cylinder, said means on the shaft comprising a plurality of wobble members secured to the shaft and lying in planes out of 90° relation to the longitudinal axis of the shaft, thereby to oscillate peripheral portions of the seed roll out of phase with each other and to move that portion of the seed roll being engaged by the saw cylinder back and forth axially of the saw cylinder.

4. Apparatus as defined in claim 3 in which the wobble members are discs and in which there are teeth or serrations on the peripheries of the discs.

5. Apparatus as defined in claim 3 in which the shaft is located eccentrically of the roll box closer to the periphery of the saw cylinder than to the walls of the roll box.

6. The combination with a cotton gin embodying a roll box for a seed cotton roll in which there operates the periphery of a rotatable saw cylinder, of a plurality of closely spaced freely rotatable rollers extending the length of the roll box parallel to the longitudinal axis of the saw cylinder, said rollers being spaced close together and defining a curved side of the roll box generally diametrically opposite the periphery of the saw cylinder located in the roll box, an axially fixed shaft mounted in the roll box, a plurality of wobble members spaced at intervals along the shaft and effective to rotate the seed roll upon rotation of the shaft to oscillate peripheral portions of the seed roll out of phase with each other, and means positively to rotate the shaft at a speed to provide rotational slippage between the seed roll and the wobble members and with the surface of the roll going in the same direction as the adjacent surfaces of the saw cylinder, said shaft being located closer to the periphery of the saw cylinder within the roll box than to the walls of the roll box.

7. The combination with a cotton gin embodying a rotating saw cylinder disposed for operating upon a seed roll in a roll box, of an axially fixed shaft in the roll box, means on the shaft projecting into the seed roll and effective to rotate the seed roll in said roll box, the periphery of said means being closer to the periphery of the saw cylinder than to the walls of the roll box, and means positively to rotate the shaft at a speed to provide rotational slippage between the seed roll and the projecting means and in a direction with the surface of the roll adjacent the saw cylinder turning in the same direction as the adjacent surface of the saw cylinder, said means on the shaft being effective upon rotation of the shaft at a greater speed than the seed roll to oscillate peripheral portions of the seed roll out of phase with each other and to move that portion of the seed roll being engaged by the saw cylinder back and forth axially of the saw cylinder.

8. The combination of claim 7 in which the configuration of the roll box relative to the periphery of the seed roll engaging means on the shaft is such as to provide an ever increasing roll box space for the seed roll in the direction of its rotation as measured from the closest point between the peripheries of said means and the saw cylinder.

9. The process of ginning cotton which comprises forming seed cotton into an elongated roll, positively rotating the roll by driving it throughout its length along its longitudinal axis and concomitantly therewith oscillating peripheral portions of the seed roll out of phase with each other in directions axially of the saw cylinder, and continuously ginning cotton from such rotating and oscillating roll by engaging the lower oscillating surface thereof with a plurality of saw members spaced apart a distance less than the amount of axial oscillatory travel of the lower surface of the roll.

10. The combination with a cotton gin embodying a rotating saw cylinder disposed for operating upon a portion of the periphery of a seed roll in a roll box, of an axially fixed shaft in the roll box extending the length thereof, a plurality of axially spaced members mounted on the shaft effective to rotate the seed roll and further effective upon rotation of the shaft to oscillate peripheral portions of the seed roll out of phase with each other in directions axially of the shaft, and means positively to rotate the shaft at a speed to provide rotational slippage between said members and the seed roll, whereby that portion of the periphery of the seed roll being operated upon by the saw cylinder oscillates back and forth over the saw cylinder.

11. The process of ginning cotton which comprises forming seed cotton into an elongated roll, positively rotating the roll by driving it throughout its length along its longitudinal axis and concomitantly therewith oscillating peripheral portions of the seed roll out of phase with each other in directions axially of the saw cylinder and continuously ginning cotton from such rotating and oscillating roll by engaging the surface thereof with a plurality of saw members spaced axially apart.

References Cited in the file of this patent

UNITED STATES PATENTS

| | | |
|---|---|---|
| 239,883 | Tate | Apr. 5, 1881 |
| 246,276 | Kinney | Aug. 23, 1881 |
| 274,806 | Milburn | Mar. 27, 1883 |
| 823,439 | Reynolds | June 12, 1906 |
| 961,393 | Wilson | June 14, 1910 |
| 1,266,643 | Wakefield | May 21, 1918 |
| 1,460,228 | Cumpston | June 26, 1923 |